United States Patent
Muharemovic et al.

(10) Patent No.: US 9,473,219 B2
(45) Date of Patent: *Oct. 18, 2016

(54) ENABLING COORDINATED MULTI-POINT RECEPTION

(71) Applicant: TEXAS INSTRUMENTS INCORPORATED, Dallas, TX (US)

(72) Inventors: Tarik Muharemovic, Pearland, TX (US); Zukang Shen, Richardson, TX (US); Anthony Edet Ekpenyong, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 112 days.

This patent is subject to a terminal disclaimer.

(21) Appl. No.: 14/588,235

(22) Filed: Dec. 31, 2014

(65) Prior Publication Data

US 2015/0117417 A1 Apr. 30, 2015

Related U.S. Application Data

(63) Continuation of application No. 13/767,040, filed on Feb. 14, 2012, now Pat. No. 9,231,666, which is a continuation of application No. 12/611,547, filed on Nov. 3, 2009, now Pat. No. 8,380,240.

(60) Provisional application No. 61/110,685, filed on Nov. 3, 2008.

(51) Int. Cl.
*H04B 7/02* (2006.01)
*H04W 56/00* (2009.01)
*H04L 12/26* (2006.01)

(52) U.S. Cl.
CPC ........... *H04B 7/024* (2013.01); *H04L 43/0852* (2013.01); *H04W 56/0045* (2013.01); *H04W 56/0065* (2013.01)

(58) Field of Classification Search
CPC ......... H04W 56/0045; H04W 56/001; H04W 56/0065; H04W 56/00; H04L 5/0035; H04B 7/024

See application file for complete search history.

(56) References Cited

U.S. PATENT DOCUMENTS

2007/0298802 A1 12/2007 Kaminski

OTHER PUBLICATIONS

3GPP R1-082468, "Carrier Aggregation in LTE-Advanced", Ericsson, Warsaw, Poland, Jun. 30-Jul. 4, 2008.
3GPP R1-082469, "LTE-Advanced—Coordinated Multipoint Transmission/Reception", Ericsson, Warsaw, Poland, Jun. 30-Jul. 4, 2008.
3GPP R1-083069, "LTE-Advanced—Coordinated Multipoint Transmission/Reception", Ericsson, Jeju, Korea, Aug. 18-22, 2008.
3GPP R1-082575, "Proposals for LTE-Advanced Technologies", NTT DoCoMo, Inc., Warsaw, Poland, Jun. 30-Jul. 4, 2008.

*Primary Examiner* — Nam Huynh
(74) *Attorney, Agent, or Firm* — Ronald O. Neerings; Frank D. Cimino

(57) ABSTRACT

This invention measures the propagation delay $\tau_1$ between the user equipment and a first cooperating unit and the propagation delay $\tau_2$ between the user equipment and a second cooperating unit. These propagation delays are used to compute a timing advance amount to the user equipment to enable coordinated multi-point reception. In a first embodiment one cooperating unit receives a function of the propagation delay, computes the timing advance amount and transmits a timing advance command to the user equipment. In a second embodiment a central unit performs these operations.

30 Claims, 4 Drawing Sheets

ENABLING COORDINATED MULTI-POINT RECEPTION

CLAIM OF PRIORITY

This application is a continuation of prior application Ser. No. 13/767,040, filed Feb. 14, 2013, which is a continuation of prior application Ser. No. 12/611,547, filed Nov. 3, 2009, which claims priority under 35 U.S.C. 119(e)(1) to U.S. Provisional Application No. 61/110,685 filed Nov. 3, 2008, now U.S. Pat. No. 8,380,240.

TECHNICAL FIELD OF THE INVENTION

The technical field of this invention is protocols in wireless communications.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

A number of advanced features are being considered to enhance the cell throughput and/or the cell-edge throughput of the Evolved Universal Terrestrial Radio Access (E-UTRA) during the long term evolution (LTE) study stage. In coordinated multi-point reception (also know as macro-diversity), received signals from multiple cooperating units are combined and processed at a single location. This single location may be different for different user equipments (UEs). In different instances, cooperating units can be separate e-NodeBs, remote-radio units (RRUs), relays etc. The main concern is that coordinated multi-point reception requires coordinated multi-point synchronization.

Coordinated multi-point reception has a problem in different signal propagation delays from the UE to different cooperating units. FIG. 1 illustrates a first propagation delay $\tau_1$ between UE 201 and cooperating unit 211 and a second propagation delay $\tau_2$ between UE 201 and cooperating unit 212.

Proper receiver operation in any communication system requires appropriate timing synchronization with the transmitter. Multi-point reception requires the UE to be simultaneously synchronized to both cooperating unit receivers. In certain cases, this would be practically impossible to achieve. Whenever $|\tau_1-\tau_2|$ exceeds the cyclic prefix duration this goal is practically impossible to achieve. However, it is possible to achieve simultaneous synchronization to different cooperating units in most other cases.

As in any other Orthogonal Frequency Division Multiplexing (OFDM) based system, the receiver timing can be regarded as a reference point for synchronization. All UEs talking to the receiver should adjust their transmission timing so that their signals arrive approximately simultaneously within the Cyclic Prefix (CP) tolerance at the receiver. Timing advance (TA) commands are sent to each UE to compensate for the propagation delay in the channel. Upon reception of a timing advance command, the UE adjusts its uplink transmission timing for Physical Uplink Control CHannel (PUCCH), Physical Uplink Shared CHannel (PUSCH) and sounding reference signals (SRS). The timing advance command indicates the change of uplink timing relative to the current uplink timing in multiples of a frame time constant. This propagation delay is commonly understood to be the first arriving path. For the example illustrated in FIG. 2, a TA command to advance timing, with respect to cooperating unit 211, by $\tau_1$, could be transmitted to the UE 201. Than the CP removal absorbs all the trailing paths from UE 201 to cooperating unit 211. In certain implementations the UE is expected to be heard by cooperating receivers at multiple different cooperating units, with different propagation delays. This situation is illustrated in FIG. 1 where UE 201 transmits to both cooperating receivers 211 and 211. Consequently, TA commands ought to depend on propagation delays to most or all of the cooperating units.

SUMMARY OF THE INVENTION

This invention concerns overcoming some issues with coordinated multi-point reception. This invention also presents an initial study of throughput enhancements through Macro-diversity via cooperating receiving units.

In this invention at least two cooperating base station units measure the propagation delay $\tau_1$ between the user equipment and a first cooperating unit and the propagation delay $\tau_2$ between the user equipment and a second cooperating unit. These propagation delays are used to compute a timing advance amount to the user equipment to enable coordinated multi-point reception. In a first embodiment the second cooperating unit computes function $f(\tau_2)$ of the propagation delay $\tau_2$ which it transmits to the first cooperating unit. The first cooperating unit computes the timing advance amount and transmits a corresponding timing advance command to the user equipment. In a second embodiment a central unit receives respective functions $f(\tau_1)$ and $f(\tau_2)$ and computes the timing advance amount. This central unit them transmits the corresponding timing advance command to the user equipment. The function $f(\tau)$ may be quantization of the propagation delay $\tau$ or a suggested timing advance amount.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
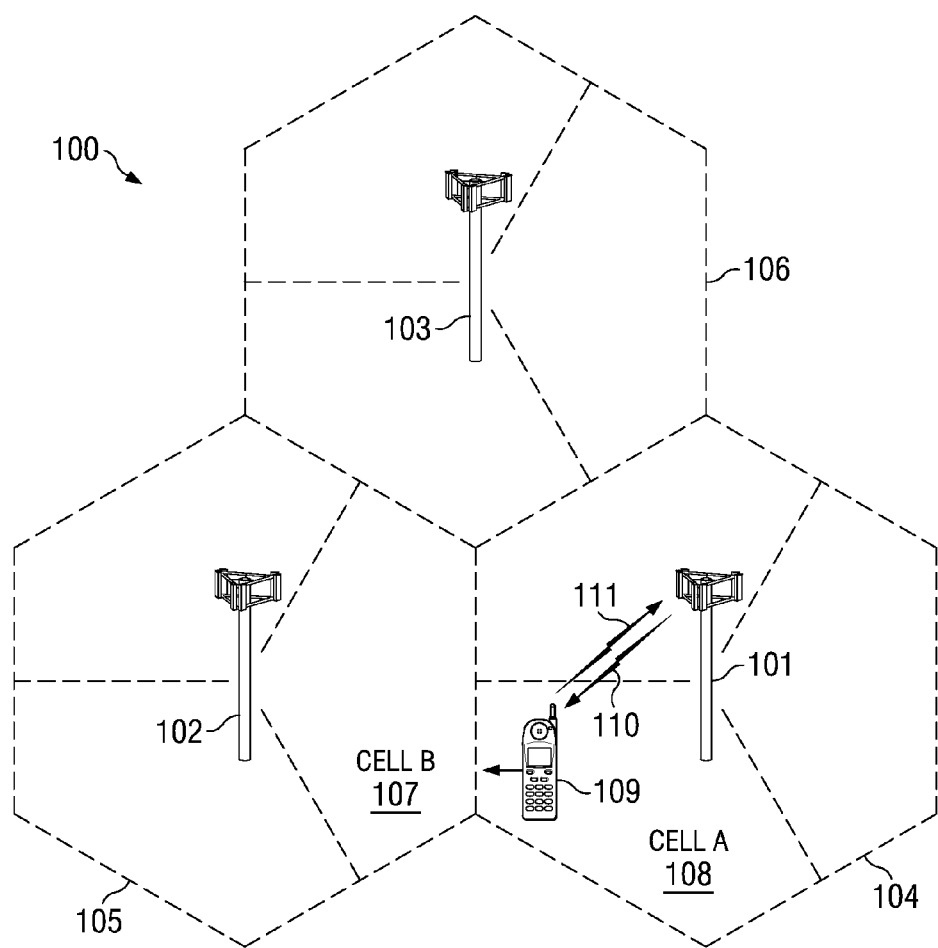
FIG. 1 is a diagram of a communication system of the prior art related to this invention having three cells.
Figure 2:
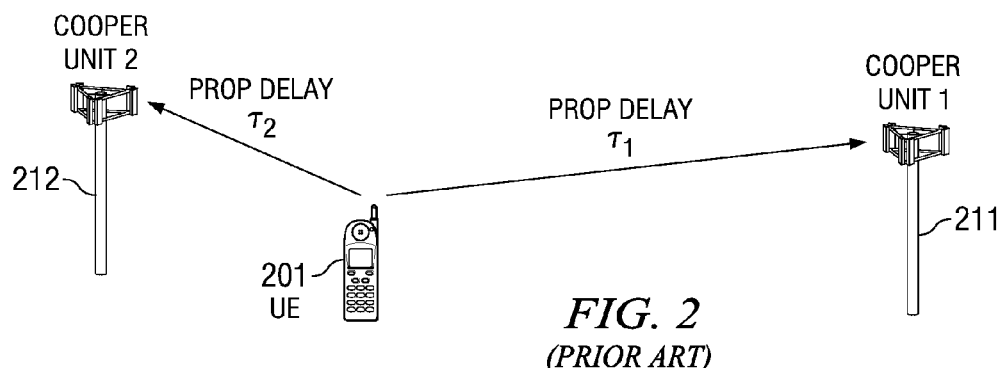
FIG. 2 illustrates the typical signal propagation delays at cooperating units in the prior art.
Figure 3:
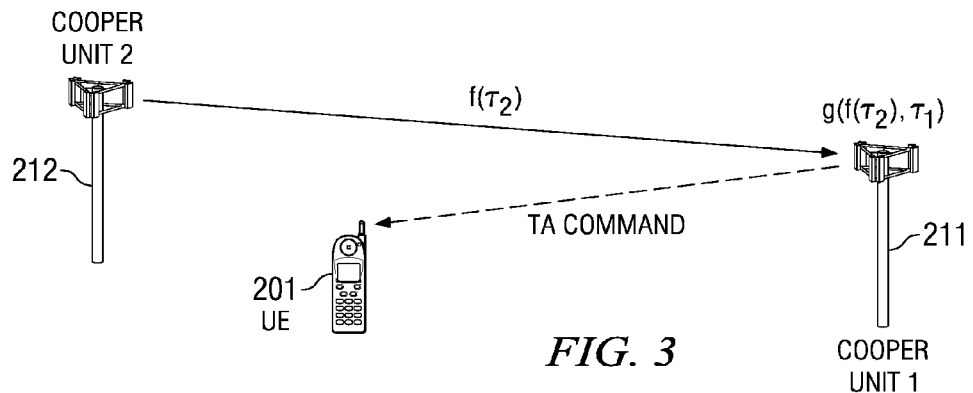
FIG. 3 illustrates computing a timing advance command at one cooperating unit according to this invention.

FIG. 3 illustrates a first embodiment for achieving multi-point synchronization uses the concept of a serving/primary cooperating unit. This serving/primary cooperating unit may be an e-NodeB. The non-serving or second cooperating unit still participates in signal detection for the UE. Second cooperating unit 212 measures the propagation delay $\tau_2$ from UE 201 to itself. Second cooperating unit 221 then transmits $f(\tau_2)$, which is a function of this propagation delay $\tau_2$, to first cooperating unit 211. Function $f(\tau_2)$ could be either a quantization of the measured propagation delay $\tau_2$ or a TA suggestion by second cooperating unit 212. First cooperating unit 211 then processes all the needed information and decides on the TA command to be sent to UE 210. First cooperating unit 211 then transmits the TA command to UE 210 including $g(f(\tau_2), \tau_1)$, which is a function of $f(\tau_2)$ and $\tau_1$. These transmissions are illustrated in FIG. 2. Mechanisms for these transmissions are already existent including: Random Access Channel (RACH); and sounding reference signals (SRS). The network determines whether UE 201 transmits via RACH or SRS to second cooperating unit 212.

Figure 4:
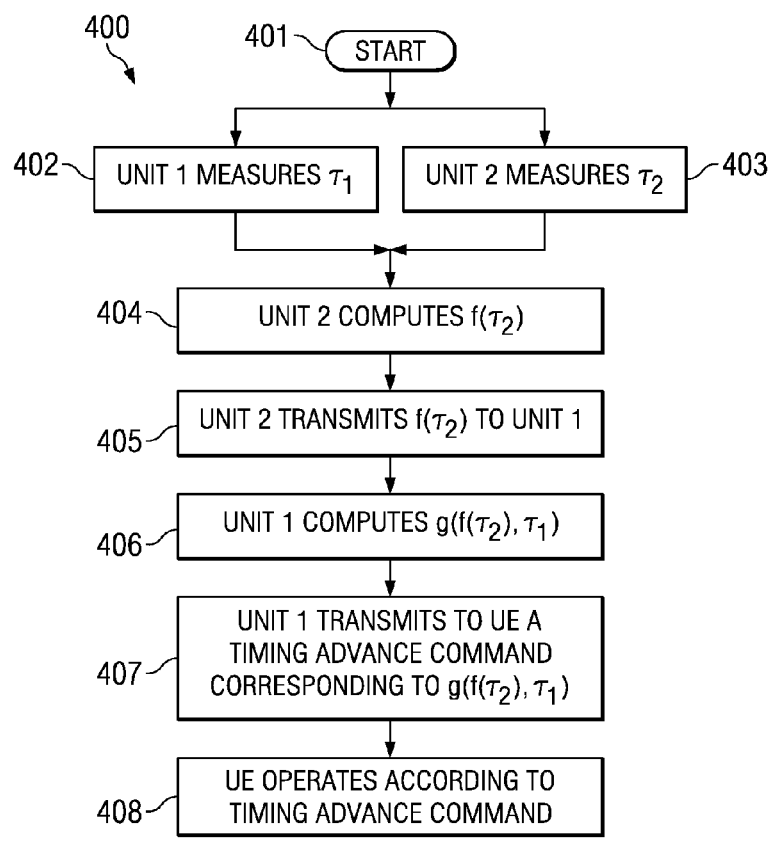
FIG. 4 is a flow chart illustrating the steps of the embodiment of the invention illustrated in FIG. 3.

FIG. 4 illustrate steps of the method 400 of the embodiment illustrated in FIG. 3. Method 400 begins at start block 401. At block 402 cooperating unit 211 measures the propagation delay $\tau_1$ from UE 201. At block 403 cooperating unit 212 measures the propagation delay $\tau_2$ from UE 202. As shown in the parallel structure in FIG. 4 these measurements are independent and can occur sequentially or simultaneously.

In block 404 second cooperating unit 212 computes the function $f(\tau_2)$. As noted above function $f(\tau_2)$ could be either a quantization of the measured propagation delay $\tau_2$ or a TA amount suggestion. In block 405 second cooperating unit 212 transmits this function $f(\tau_2)$ to first cooperating unit 211.

In block 406 first cooperating unit 211 computes the function $g(f(\tau_2), \tau_1)$. In block 407 first cooperating unit 211 transmits a TA command to UE 201 corresponding to the computed function $g(f(\tau_2), \tau_1)$. This TA command is selected to enable coordinated multi-point reception at UE 201. In block 408 UE 201 operates according to this TA command.

The technique described in relation to FIGS. 3 and 4 is appropriate for the case where cooperating units are e-NodeBs. However, this functionality may also be built into more advanced remote radio units. In general, a measurement based on signal time delay could be defined by the measurement specification. The signal time delay is expected to be specific to a particular UE. This measurement can be communicated either to the network or directly to another cooperating unit.

Figure 5:
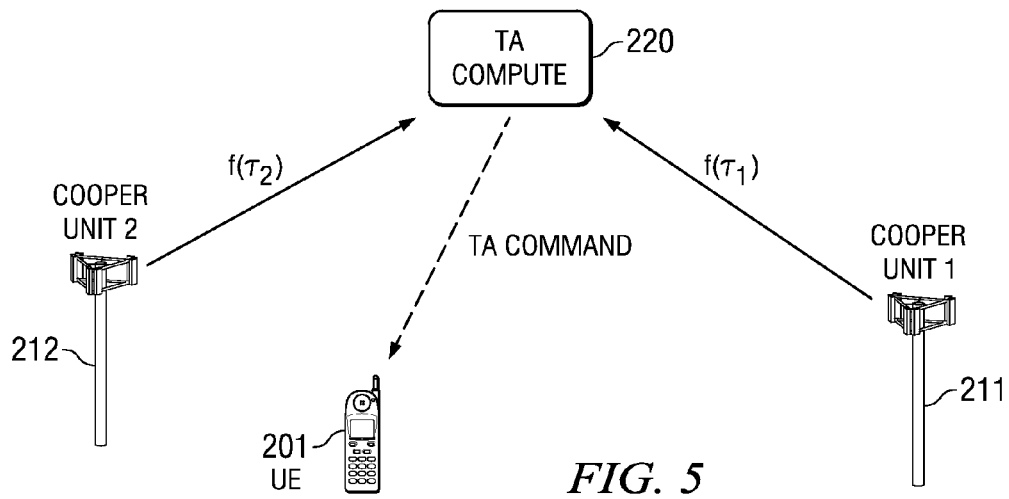
FIG. 5 illustrates computing a timing advance command by a network according to this invention.

A second embodiment to achieve network synchronization, is a symmetric option illustrated in FIG. 5. Each cooperating unit 211 and 212 determines the corresponding propagation delay $\tau_1$ and $\tau_2$ to UE 201. Cooperating units 211 and 212 make corresponding inferences $f(\tau_1)$ and $f(\tau_2)$ on the respective propagation delays. Cooperating units 211 and 212 transmit the inferences $f(\tau_1)$ and $f(\tau_2)$ to central location 220. Central location 220 computes the needed TA command and sends it to UE 201. Note that the TA command can also be sent through one or both cooperating units 211 or 212.

Figure 6:
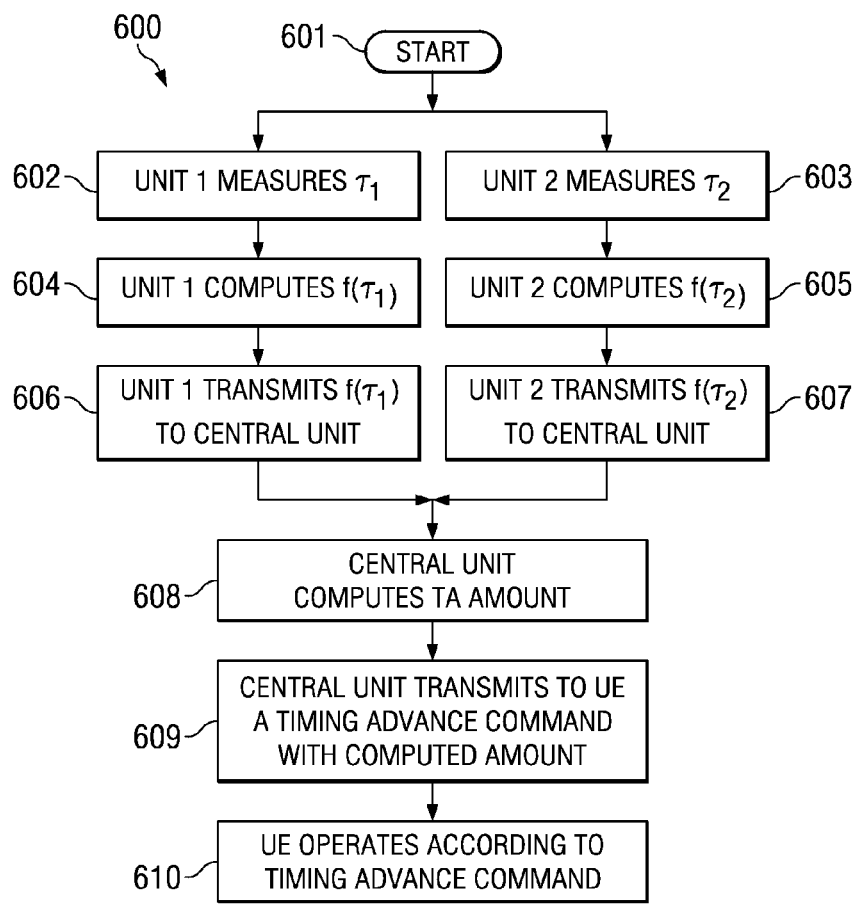
FIG. 6 is a flow chart illustrating the steps of the embodiment of the invention illustrated in FIG. 6.

FIG. 6 illustrate steps of the method 600 of the embodiment illustrated in FIG. 5. Method 600 begins at start block 601. At block 602 cooperating unit 211 measures the propagation delay $\tau_1$ from UE 201. At block 603 cooperating unit 212 measures the propagation delay $\tau_2$ from UE 202. In block 604 first cooperating unit 211 computes the function $f(\tau_1)$. In block 605 second cooperating unit 212 computes the function $f(\tau_2)$. In block 606 first cooperating unit 211 transmits the function $f(\tau_1)$ to central unit 220. In block 607 second cooperating unit 212 transmits the function $f(\tau_2)$ to central unit 220. As shown in the parallel structure in FIG. 6 the two chains 602-604-606 and 603-605-607 are independent and can occur sequentially or simultaneously.

In block 608 central unit 220 computes the function amount needed in a TA command to UE 201. This TA command amount is selected to enable coordinated multi-point reception at UE 201. In block 60 central unit 220 transmits a TA command to UE 201 corresponding to the computed TA amount. In block 610 UE 201 operates according to this TA command.

In general, when Macro-diversity is used in the uplink (UL) with signals processed at a central location, the system capacity can be extremely large. A portion of the network can be treated a single very large Multiuser, Multiple Input, Multiple Output (MU-MIMO) system becoming almost purely Adaptive White Gaussian Noise (AWGN) limited. However, the computational complexity of this technique could become very large, especially when using more advanced receiver techniques.

The following is an example of how the network computes the timing advance. In FIG. 3 cooperating unit 211 is the serving cell for UE 201. Cooperating unit 211 measures the propagation delay $\tau_1$ using random access preamble transmission from UE 201 or SRS transmission from UE 201. Cooperating unit 212 provides a SRS sequence or RACH preamble to UE 201 via the serving cell 211. UE 201 is instructed at regular intervals to transmit the SRS or RACH preamble to cooperating unit 212 enabling cooperating unit 212 to measure the propagation delay $\tau_2$. The function $f(\tau_2)$ could be the absolute propagation delay $\tau_2$ or a delta offset value from the common network timing if both cooperating units are synchronized. The serving cell, cooperating unit 211, then computes the timing advance command $g(f(\tau_2), \tau_1)$ such that $|\tau_1 - \tau_2|$ is within a tolerable fraction of the cyclic prefix of each cooperating unit.

This scheme is generally applicable to K cooperating units, with K greater than or equal to 2. The set of cooperating units for a UE can be chosen based on multiple criteria such as reference signal received power (RSRP), signal to interference plus noise ratio (SINR) and propagation delay. An example is as follows. The UE sequentially transmits SRS to K base stations, where the RSRP of the Kth base station is within a defined tolerance of the RSRP of the serving base station of the UE. Alternatively, the UE sequentially transmits SRS to K base stations where the uplink SINR seen by the Kth base station is within a defined tolerance of the SINR seen by the serving base station of the UE. The Kth base station measures the propagation delay $\tau_k$ and sends $f(\tau_k)$ to a network decision unit. The network decision unit determines a set of M cooperating units from the K (M≤K) base stations such that for the Mth base station $|\tau_0 - \tau_m|$ is within a tolerable fraction of its cyclic prefix, where $\tau_0$ is a network reference time. The network then sends the appropriate timing advance command to the UE. FIG. 5 illustrates this example for M=2 cooperating units 211 and 212, one UE 201 and network decision unit 220.

The following describes a simulation of the invention in a 19-site system having a matched filter receiver combining signals across cellular sites and different cells. This effectively combines the signal to interference plus noise ratios (SINRs) of any given user at multiple cellular sites. Table 1 lists the assumptions employed in this simulation.

TABLE 1

| Parameter | Assumption |
| --- | --- |
| Cellular Layout | Hexagonal Grid; 19 NodeBs |
| User Drop | Uniformly Inside the Cell |
| Minimum Distance Between UE and NodeB Antenna Bore Site | 35 m |
| | Towards Flat Side of the Cell |
| Inter - Site Distance | 500 m or 1732 m |
| Shadowing Standard Deviation | 8 dB |
| Path Loss | $128.1 + 37.6\log_{10}(R)$ where R is |
| Shadowing Standard Deviation | 8 dB |
| Shadowing Between Cells | 1.0 |
| Correlation Between NodeBs | 0.5 |
| Penetration Loss | 2 dB |
| Antenna Pattern | $A = -\min(12\ (\theta/\theta_{3\ dB})^2,\ 20\ dB)$. |
| System Bandwidth | 2.5 MHz @ 2 GHz |
| Numerology   RB size | 24 Sub-Carriers |
|              Number of RBs | 6 |
| Channel Model | SCM-C |
| UE Velocity | 3 kmh or 30 kmh |
| UE Power Class | 24 dBm |
| Number of UE Antennas | 1 |
| Number of NodeB Antennas | 2 |
| Channel Estimation Penalty | 1 dB |
| UE Antenna Gain | 0 dBi |
| NodeB Antenna Gain | 14 dBi |
| Number of UEs per NodeB/Cell | 18/6 |
| HARQ Type | Chase Combining |
| Maximum Number of Retransmissions | 5 |
| HARQ Retransmission Delay | 5 TTI |
| Traffic Model | Full Buffer |
| Scheduler | Proportional Fair |
| Scheduling Delay | 1 TTI |
| Uplink Power Control | Slow with 40 TTI Period |
| MCS Set | QPSK: (1/5, 1/4, 1/3, 1/2, 5/8) 16QAM: (1/3, 1/2, 5/8, 3/4) |

Table 2 lists the UE power settings examined in this simulation.

TABLE 2

| System Configuration | 1 | 2 | 3 | 4 | 5 |
| --- | --- | --- | --- | --- | --- |
| % of UEs at Pmax | 1% | 5% | 10% | 25% | 50% |

It is possible to further enhance the system throughput using a minimum mean square error (MMSE) receiver.

Figure 7:
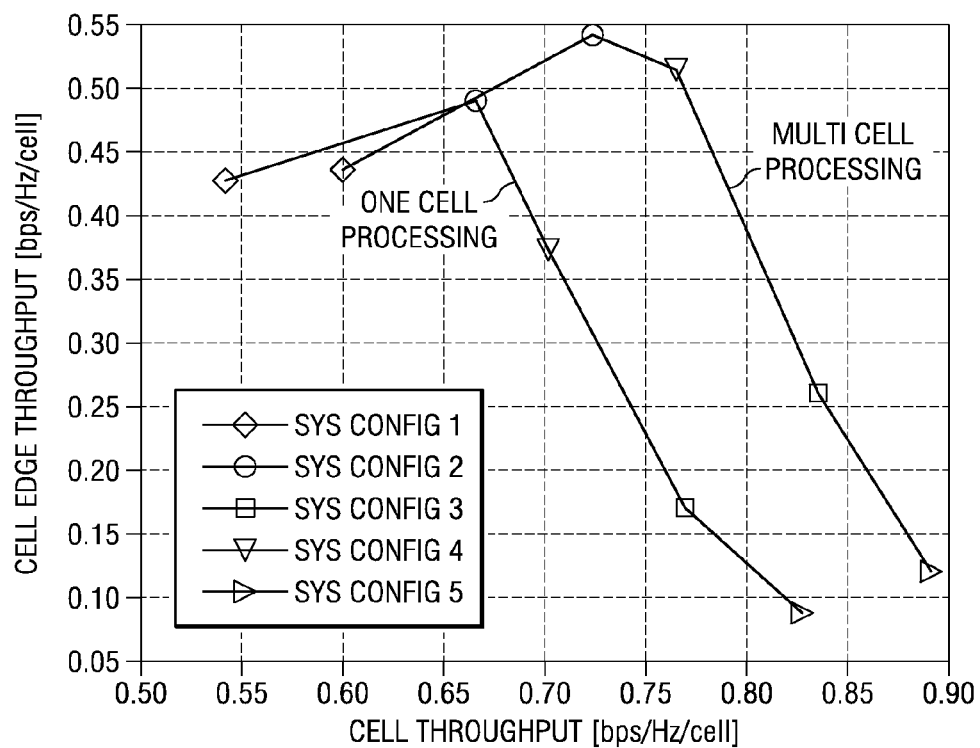
FIG. 7 illustrates simulated results of the cell edge throughput versus cell throughput for full path loss compensation according to this invention.
Figure 8:
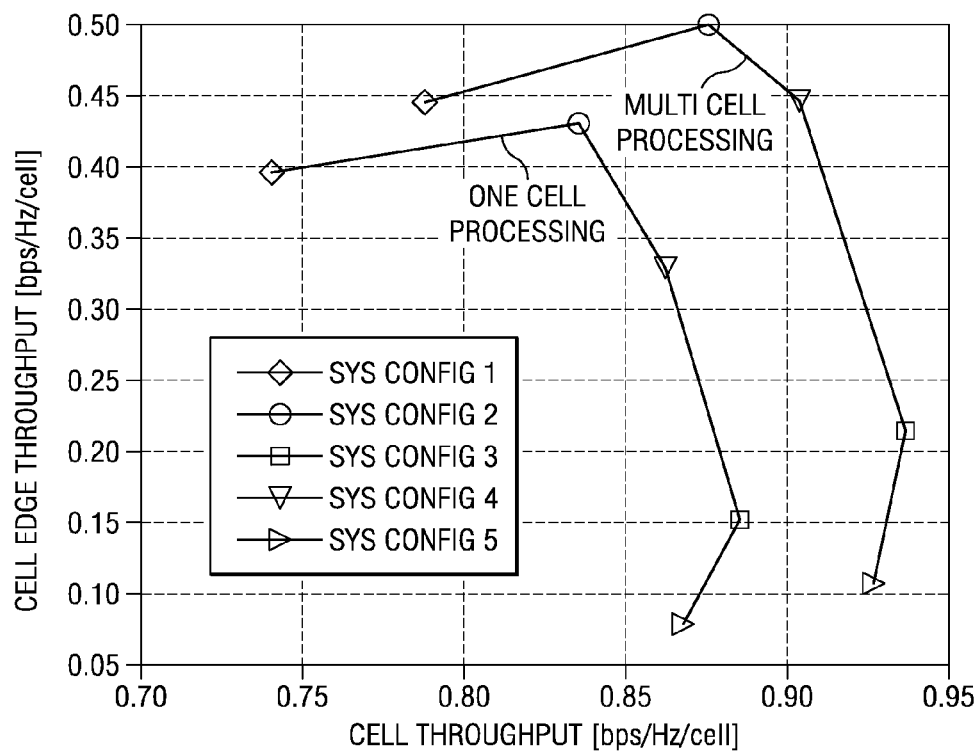
FIG. 8 illustrates simulated results of the cell edge throughput versus cell throughput for partial path loss compensation according to this invention.

FIGS. 7 and 8 illustrate simulation results. FIG. 7 illustrates the simulated throughput results under the full path loss compensation. FIG. 7 includes points for each of the system power configurations listed in Table 2 for one cell processing and for multi-cell processing. As illustrated in FIG. 7, the gain of macro-diversity SINR combining is mostly to enhance cell-edge performance. For example, for a cell throughput of 0.77 b/s/Hz/cell, one cell processing provides about 0.15 b/s/Hz/cell for cell edge whereas multi-cell processing gives above 0.5 b/s/Hz/cell. Thus, the cell-edge throughput can be substantially enhanced using macro-diversity. FIG. 8 illustrates a similar result for system throughputs with partial path loss compensation.

Even using simple SINR combining at a central processing location, the cell-edge throughput can be substantially enhanced. Depending on the operating point of cell-average throughput, this enhancement can be a factor of a few to several. Furthermore, using more advanced MIMO processing at the receiver further improves the extent of potential gains. Multi-point synchronization Therefore thus enable macro-diversity reception.

What is claimed is:

1. A method of operating at least two cooperating units for coordinated multi-point reception comprising the steps of:
    measuring at a first cooperating base unit the propagation delay $\tau_1$ between a user equipment and the first cooperating unit;
    measuring at a second cooperating base unit the propagation delay $\tau_2$ between the user equipment and a second cooperating unit;
    computing at the first cooperating unit a function $f(\tau_1)$ of the propagation delay $\tau_1$;
    computing at the second cooperating unit a function $f(\tau_2)$ of the propagation delay $\tau_2$;
    transmitting the computed function $f(\tau_1)$ from the first cooperating unit to a central unit;
    transmitting the computed function $f(\tau_2)$ from the second cooperating unit to the central unit;
    computing at a central unit a timing advance amount for the user equipment for coordinated multi-point reception from said functions $f(\tau_1)$ and $f(\tau_2)$; and
    transmitting a timing advance command having the computed timing advance amount from the central unit to the user equipment.

2. The method of claim 1, wherein said propagation delay $\tau_1$ is transmitted to a central unit, wherein said function $f(\tau_1)$ is computed at a central unit.

3. The method of claim 1, wherein said propagation delay $\tau_2$ is transmitted to a central unit, wherein said function $f(\tau_2)$ is computed at a central unit.

4. The method of claim 1, wherein said timing advance is used in coordinated multi-point reception.

5. The method of claim 1, wherein said function $f(\tau_1)$ is a quantization of the propagation delay $\tau_1$.

6. The method of claim 1, wherein said function $f(\tau_1)$ is a suggested timing advance amount corresponding to the propagation delay $\tau_1$.

7. The method of claim 1, wherein said function $f(\tau_2)$ is a quantization of the propagation delay $\tau_2$.

8. The method of claim 1, wherein said function $f(\tau_2)$ is a suggested timing advance amount corresponding to the propagation delay $\tau_2$.

9. A method of operating a user equipment comprising the steps of:
    transmitting a reference signal for measurement of propagation delay $\tau_1$ between the user equipment and a first cooperating unit;
    transmitting a reference signal for measurement of propagation delay $\tau_2$ between the user equipment and a second cooperating unit;
    receiving a timing advance command having a computed timing advance amount,
        wherein the timing advance command is computed from functions $f(\tau_1)$ and $f(\tau_2)$,
        wherein said functions $f(\tau_1)$ and $f(\tau_2)$ are computed from said propagation delay $\tau_1$ and propagation delay $\tau_2$, respectively.

10. The method of claim 9, wherein said functions $f(\tau_1)$ and $f(\tau_2)$ are calculated at the first cooperating unit and the second cooperating unit, respectively, wherein $f(\tau_1)$ and $f(\tau_2)$ are transmitted to the central unit.

11. The method of claim 9, wherein said measurement $\tau_1$ and $\tau_2$ are transmitted from the first cooperating unit and the second cooperating unit, respectively, to the central unit.

12. The method of claim 9, wherein said function $f(\tau_1)$ is a quantization of the propagation delay $\tau_1$.

13. The method of claim 9, wherein said function $f(\tau_1)$ is a suggested timing advance amount corresponding to the propagation delay $\tau_1$.

14. The method of claim 9, wherein said function $f(\tau_2)$ is a quantization of the propagation delay $\tau_2$.

15. The method of claim 9, wherein said function $f(\tau_2)$ is a suggested timing advance amount corresponding to the propagation delay $\tau_2$.

16. The method of claim 9, wherein said timing advance is used in coordinated multi-point reception.

17. A method of operating a user equipment for coordinated multi-point reception comprising the steps of:
    transmitting a reference signal for measurement of propagation delay $\tau_1$ between the user equipment and a first cooperating unit;
    transmitting a reference signal for measurement of propagation delay $\tau_2$ between the user equipment and a second cooperating unit;
    receiving a timing advance command having a computed timing advance amount from the first cooperating unit, wherein the timing advance command is computed at the first cooperating unit from function $g(f(\tau_2), \tau_1)$,
    wherein the function $f(\tau_2)$ is transmitted from the second cooperating unit to the first cooperating unit,
    wherein the function $g(f(\tau_2), \tau_1)$ is computed from function $f(\tau_2)$ and the propagation delay $\tau_1$,
    wherein function $f(\tau_2)$ is computed from the propagation delay $\tau_2$.

18. A method of operating a user equipment in a group of K cooperating units comprising the steps of:
    transmitting a reference signal for measurement of propagation delay t between the user equipment and a $k^{th}$ cooperating unit;
    receiving a timing advance command having a computed timing advance amount,
    wherein the timing advance command is computed from the functions $f(\tau_k)$ where k=1, 2 . . . K,
    wherein said functions $f(\tau_k)$ are computed from said propagation delays $\tau_k$.

19. The method of claim 18, wherein said functions $f(\tau_k)$ are calculated at the $k^{th}$ cooperating unit, wherein $f(\tau_k)$ is transmitted to a central unit.

20. The method of claim 18, wherein said function $f(\tau_k)$ is a quantization of the propagation delay $\tau_k$.

21. The method of claim 18, wherein said function $f(\tau_k)$ is a suggested timing advance amount corresponding to the propagation delay $\tau_k$.

22. The method of claim 18, wherein said timing advance is used in coordinated multi-point reception.

23. The method of claim 18, wherein said functions $f(\tau_k)$ are transmitted from each $k^{th}$ unit to a central unit.

24. The method of claim 23, wherein said timing advance command is received from a central unit, wherein said timing advance is computed at a central unit.

25. A user equipment comprising:
    circuitry for transmitting a reference signal for measurement of propagation delay $\tau_1$ between the user equipment and a first cooperating unit;
    circuitry for transmitting a reference signal for measurement of propagation delay $\tau_2$ between the user equipment and a second cooperating unit;
    circuitry for receiving a timing advance command having a computed timing advance amount,
        wherein the timing advance command is computed from functions $f(\tau_1)$ and $f(\tau_2)$,
        wherein said functions $f(\tau_1)$ and $f(\tau_2)$ are computed from said propagation delay $\tau_1$ and propagation delay $\tau_2$, respectively.

26. The user equipment of claim 25, wherein said functions $f(\tau_1)$ and $f(\tau_2)$ are quantization of the propagation delays $\tau_1$ and $\tau_2$, respectively.

27. The user equipment of claim 25, wherein said function $f(\tau_1)$ and $f(\tau_2)$ are suggested timing advance amounts corresponding to the propagation delays $\tau_1$ and $\tau_2$, respectively.

28. A user equipment for coordinated multi-point reception comprising:
    circuitry for transmitting a reference signal for measurement of propagation delay $\tau_1$ between the user equipment and a first cooperating unit;
    circuitry for transmitting a reference signal for measurement of propagation delay $\tau_2$ between the user equipment and a second cooperating unit;
    circuitry for receiving a timing advance command having a computed timing advance amount from the first cooperating unit,
        wherein the timing advance command is computed at the first cooperating unit from function $g(f(\tau_2), \tau_1)$,
        wherein the function $f(\tau_2)$ is transmitted from the second cooperating unit to the first cooperating unit,
        wherein the function $g(f(\tau_2), \tau_1)$ is computed from function $f(\tau_2)$ and the propagation delay $\tau_1$,
        wherein function $f(\tau_2)$ is computed from the propagation delay $\tau_2$.

29. The user equipment of claim 28, wherein said function $f(\tau_2)$ is a quantization of the propagation delay $\tau_2$, respectively.

30. The user equipment of claim 28, wherein said function $f(\tau_2)$ is a suggested timing advance amount corresponding to the propagation delay $\tau_2$.

* * * * *